Figure 12:
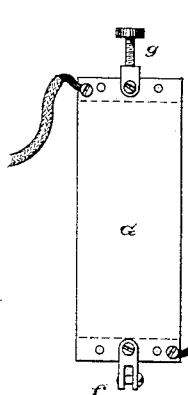

(No Model.) 5 Sheets—Sheet 1.
E. B. CUTTEN.
ELECTRIC ARC LAMP.
No. 346,430. Patented July 27, 1886.
Fig. 1. Fig. 2. Fig. 5. Fig. 6.
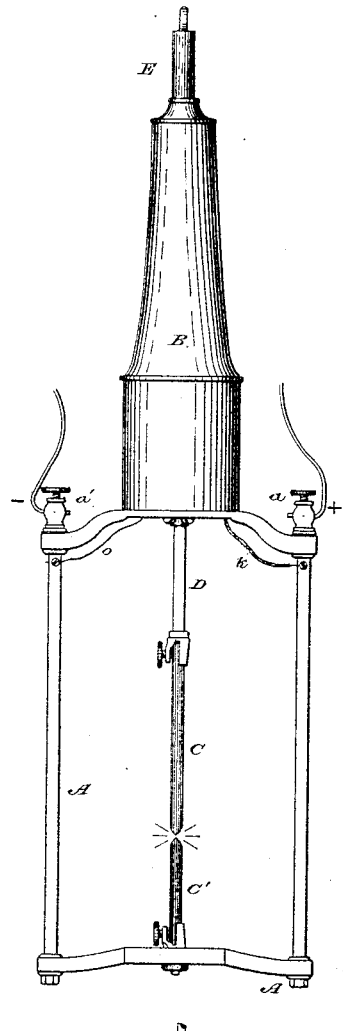
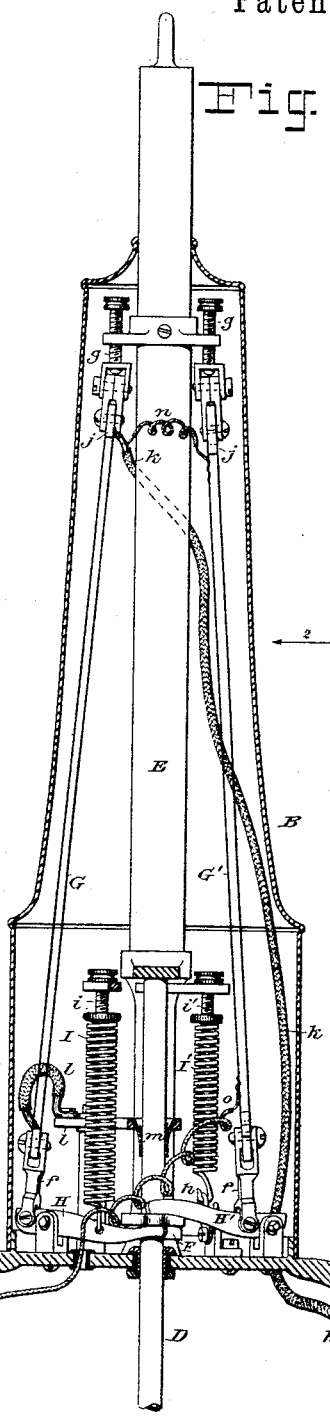
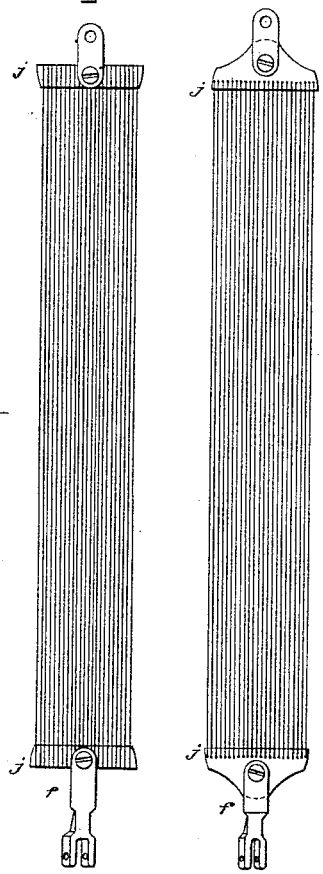
WITNESSES: INVENTOR:
E. B. Bolton
Geo. H. Fraser.
Elisha B. Cutten
By his Attorneys,
Burke, Fraser & Connell (No Model.) 5 Sheets—Sheet 2.
E. B. CUTTEN.
ELECTRIC ARC LAMP.
No. 346,430. Patented July 27, 1886.
Fig. 3.
Fig. 7.
Fig. 8.
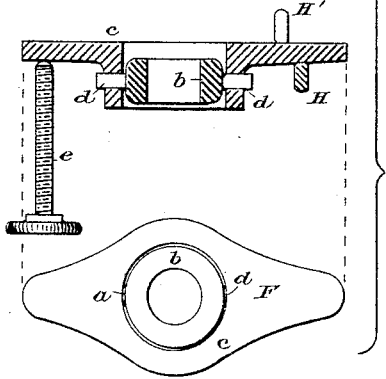
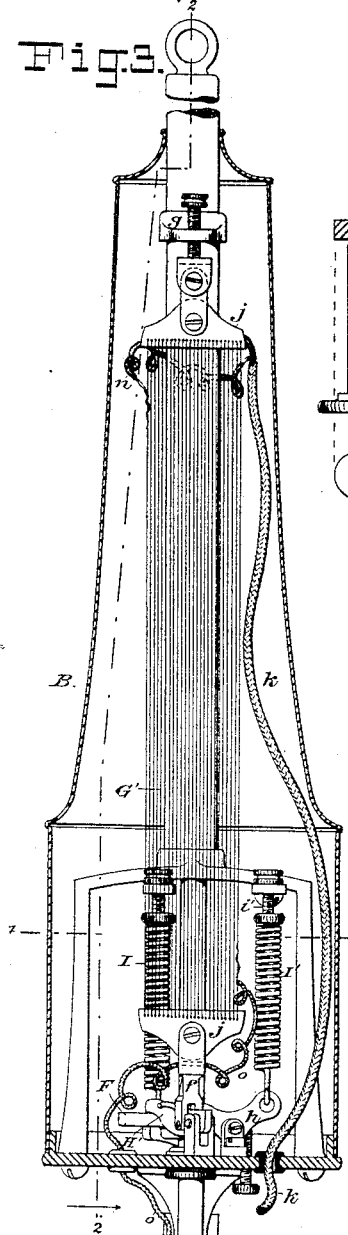
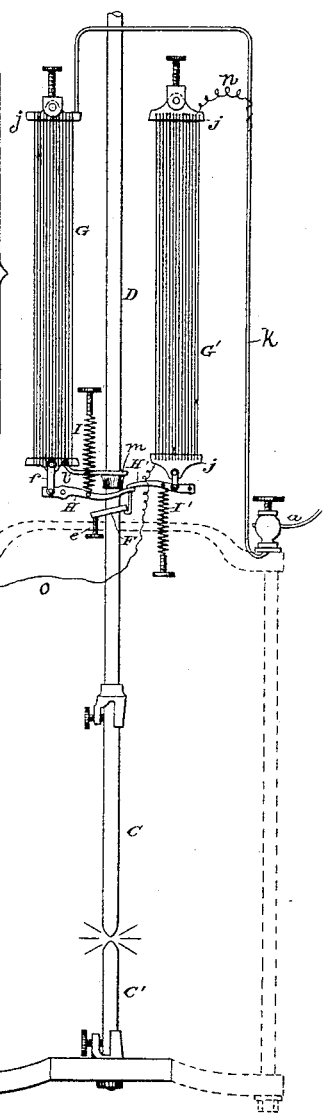
Fig. 4.
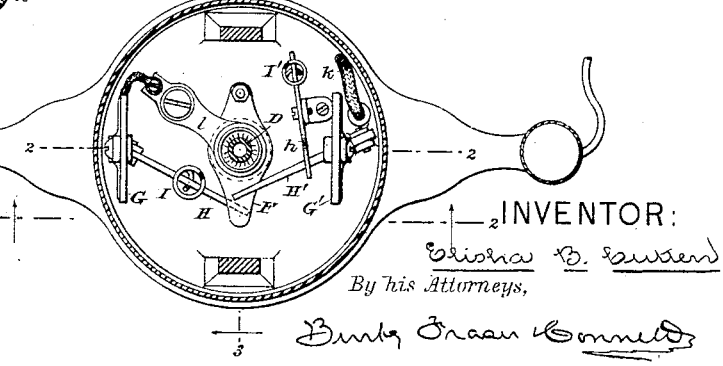
WITNESSES:
E. B. Bolton
Geo. H. Fraser.
INVENTOR:
Elisha B. Cutten
By his Attorneys,
Burke Brown Connett (No Model.) 5 Sheets—Sheet 3.

E. B. CUTTEN.
ELECTRIC ARC LAMP.

No. 346,430. Patented July 27, 1886.

WITNESSES:
E. B. Bolton
Geo. H. Fraser.

INVENTOR:
Elisha B. Cutten
By his Attorneys,
Burke Fraser Connett (No Model.) 5 Sheets—Sheet 4.

E. B. CUTTEN.
ELECTRIC ARC LAMP.

No. 346,430. Patented July 27, 1886.

WITNESSES:
E. B. Bolton
Geo. H. Fraser

INVENTOR:
Elisha B. Cutten
By his Attorneys,
Burke, Fraser & Connett (No Model.)  5 Sheets—Sheet 5.
E. B. CUTTEN.
ELECTRIC ARC LAMP.

No. 346,430. Patented July 27, 1886.

WITNESSES:  INVENTOR:

UNITED STATES PATENT OFFICE.

ELISHA B. CUTTEN, OF PITTSBURG, PA., ASSIGNOR TO THE ELECTRICAL AND MECHANICAL DEVELOPING COMPANY, OF SAME PLACE.

ELECTRIC-ARC LAMP.

SPECIFICATION forming part of Letters Patent No. 346,430, dated July 27, 1886.

Application filed April 25, 1885. Serial No. 163,486. (No model.)

*To all whom it may concern:*

Be it known that I, ELISHA B. CUTTEN, a resident of Pittsburg, in the county of Allegheny and State of Pennsylvania, have invented certain new and useful Improvements in Electric-Arc Lamps, of which the following is a specification.

This invention relates to regulating mechanism for arc lamps, pertaining partly to the mechanism for establishing the arc by parting or separating the carbons, but chiefly to the mechanism for feeding the carbons together as they consume. For both these purposes I employ as the controlling medium, and in place of the electro-magnets or solenoids most commonly heretofore used, one or more thermo-expansive conductors, which are heated and expand as the current passes through them, and which cool and contract upon the cessation or diminution of the current. The motion thus produced is communicated to the clutch or other feeding mechanism by the interposition of suitable mechanical devices.

Prior to my invention it has been proposed to employ thermo-expansive devices in substitution for magnets in electric-arc lamps. Such a lamp has been patented in which a wire is fastened at one end and joined to a lever at the other, with a spring applied to the lever in opposition to the wire, so as to stretch the latter, and the free end of the lever connected to the clutch for lifting the upper carbon-holding rod. The wire is connected in the main circuit, and when the current passes it is heated and expands, enabling the spring to tilt the lever and lift the upper carbon, thus establishing the arc. Various arrangements of thermo-springs have also been suggested for thus establishing the arc, the spring being arranged in the main circuit, or wound with a heating-coil arranged in the main circuit.

My present invention aims to apply the principle of a thermo-expanding conductor in the derived circuit to the feeding of an electric lamp, as well as to so improve the construction of such conductors for both the derived and main circuit as to render their use for the regulation of the lamp thoroughly practical and advantageous.

In Figures 1 to 8 of the accompanying drawings I have shown in detail a lamp constructed according to the preferred form of my invention.

The remaining figures are mainly diagrams, and illustrate modified methods of carrying out my invention.

Fig. 1 is an elevation of the lamp on a small scale. Fig. 2 is a vertical section, on a large scale, of the upper portion of the lamp, showing the regulating mechanism in elevation. Fig. 3 is a similar section, looking from the side. Fig. 4 is a horizontal section cut on the line 4 4 in Fig. 3. Figs. 5 and 6 are views, respectively, of the low-resistance and high-resistance thermo-expansion devices. Fig. 7 shows the tilting-ring clutch in cross-section and plan, and Fig. 8 is a diagram illustrating the circuit-connections.

Referring to these figures, let A designate the frame of the lamp; B, the case which incloses the regulator; C C', the upper and lower carbon pencils, respectively; D, the rod carrying the upper pencil; E, the long vertical tube in which this rod is housed and from which the lamp is commonly suspended, and $a$ $a'$ the binding-posts for the line-wires. These parts are or may be all of the usual construction in all essential respects, the case B being modified in form to adapt it to the parts which it incloses.

F is the clutch for gripping the rod D, which may be the common tilting ring or washer, Fig. 8, although I prefer the construction shown in Fig. 7, wherein there are two rings, the inner or gripping ring, $b$, being hung in the outer ring, $c$, on pivots $d$ $d$. The outer ring constitutes a lever, its one end resting on an adjusting-screw, $e$, and its other end being free to be lifted or depressed by the regulating mechanism. This construction of ring is the subject of my Patent No. 324,305, dated August 11, 1885, to which I refer for a more full description of its construction and advantages, and particularly of its application to a duplex lamp.

G and G' are two thermo-expansion conductors, which control the lifting and feeding of the carbon, being made to supersede the electro-magnets or solenoids heretofore used. The thermo-conductor G is an electric conductor of low resistance, and is installed in the main or arc circuit, while G' is of high resistance and installed in a derived circuit passing around the arc, their installation being the same as is commonly employed with the controlling-magnets of electric-arc lamps. Each of these thermo-conductors is attached at its upper end to an adjusting-screw, *g*, Fig. 2, and at its lower end it is connected by a link, *f*, to a lever. The thermo-conductor G is thus connected to a lever, H, and G' to a lever, H'. The lever H is connected at one end to the conductor G, and its other end takes under the clutch F, a spring, I, being arranged to draw up on the long arm of the lever, and so tending to distend the conductor G, and to lift the clutch F and elevate the rod D. The spring I is adjustable by means of a screw, *i*. The lever H' is fulcrumed at one end, and its other end takes over the clutch F. The thermo-conductor G' is connected to it near its fulcrum, and a spring, I', is arranged to press down the lever, thus tending to distend the conductor G' and to press down the clutch and cause it to release the rod D. The simplest arrangement of the spring I' is that shown in Fig. 8; but in practice, for the sake of compactness, I arrange this spring above the lever and interpose an additional lever, *h*, connecting the spring to one end thereof, and arranging the other end to overhang and press down upon the lever H'. The spring I' is adjusted by a screw, *i'*. The levers H H' should be fulcrumed on knife-edge bearings, and it is preferable, also, for the links *f f* to engage knife-edges on the lever.

The thermo-conductors G G' are constructed, by preference, as follows: A series of fine wires are stretched between cross-bars *j j* at top and bottom. In the low-resistance conductor G the current passes simultaneously through all the wires from one bar to the other. In the high-resistance conductor G' the current passes through the several wires in succession, all being in fact one wire wound spirally back and forth.

The thermo-conductor G is made by taking for the bars *j j* two pieces of metal—preferably brass—fixing them in a suitable clamp or frame and winding spirally around them, back and forth, a fine wire, preferably brass. Then while the wires are stretched they are joined to the brass bars by soldering or brazing. The conductor is then taken out of the clamp or frame. The wire is wound around the bars more or less times, according to the degree of conductivity desired, it being remembered that these lengths of fine wire have to carry the entire current that passes through the arc. They should develop resistance enough to be somewhat heated when the current is passing, reaching with the maximum current a temperature of perhaps 180° Fahrenheit, (more or less.) The circuit-connections are made with the respective bars *j j*.

The thermo-conductor G' is made by taking for the bars *j j* two pieces of insulating material, slate being preferred, which are preferably of the form shown in Fig. 6, having a row of perforations along one side. These are fixed in a frame or clamp, and a fine wire, preferably the same as is used for the thermo-conductor G, is passed through the holes, being wound spirally back and forth and its ends secured by twisting or otherwise. The opposite ends of this wire are joined in the derived circuit, so that the derived current traverses the wire spirally, like a flat coil, the separate strands or convolutions of wire being insulated from each other by their separation by the insulating cross-bars. As great a length of wire is used for the conductor G' as is necessary to give the desired resistance for the derived circuit and develop sufficient heat when the derived current is augmented by the lengthening of the arc. It is not essential that but one wire be used, as two or more wires might be used to give greater strength, the derived current dividing between them. In any case, as the derived current varies the wire of the conductor G' is more or less heated, its temperature varying in proportion to the length of the arc from about 100° to perhaps 400° Fahrenheit.

The operation is as follows, referring especially to Fig. 8, where the circuits are clearly apparent: The main current flows from binding-post *a* through wire *k* to the top of thermo-conductor G, down through the latter, thence by wire *l* (or cross-bar, shown in Figs. 2 and 4) to brush *m*, down rod D, carbons C and C', and through frame A to binding-post *a'*. The derived current flows from wire *k* through small wire *n* to one end of the wire coil of the thermo-conductor G', through the latter to the other end of the wire, and thence by wire *o* to binding-post *a'*. At starting the conductors G G' are both cold, and consequently contracted, the end of lever H is down, thus leaving the clutch free, and the end of lever H' is elevated. On turning on the current the thermo-conductor G is heated by the passage of the current through it, and expands, thus permitting the spring I to move the lever H, lifting its end, and consequently lifting the clutch F, thus causing the latter to engage and lift the rod D, whereby the upper carbon pencil is elevated and the arc is established; but a very small portion of the current passes through the derived circuit, and hence the conductor G' is not expanded sufficiently to prevent the proper lifting of the rod. As the carbons consume, and the arc lengthens, the consequent increase of resistance diverts more of the current into the derived circuit, which causes the conductor G' to heat sensibly, thus elongating it and permitting the spring I' to press down the end of lever H' against the end of lever H, and when sufficient current is thus diverted this downward pressure becomes sufficient to overcome the upward pressure of the lever H, and to depress the clutch, and consequently free the rod D, which descends and shortens the arc, whereupon the derived current decreases and the thermo-conductor G' cools with almost incredible rapidity, and by its contraction relieves the downward pressure of the lever H' and permits the lever H to again lift the clutch and arrest the further descent of the rod. Thus the two thermo-conductors work in opposition to each other, contracting and expanding alternately, as determined by the variations in the resistance of the arc and the volume of the current, and effecting a uniform and steady feed of the carbons. The spring I is strong enough to enable it to lift the lever H, the clutch F, the rod D, and the carbon C. The spring I' is much weaker, being, however, strong enough to overcome any excess of strength in the spring I and to force the depression of the lever H and clutch F, as described. It will be observed that all the work is done directly by the springs, the conductors G G' serving to retract the springs or overcome their tension. When either conductor expands before the other has time to contract, the tension of the springs is exerted against each other, and the one which at the time being exerts the least effective tension yields to the other, and one of the conductors G or G' is slackened; or the adjustment may be such that both will be slackened.

My improved regulator thus described has been found by practical trial to possess several features of marked advantage over the electromagnetic regulators heretofore used. The controlling elements—the thermo-conductors G G'—are extremely sensitive to changes in the current, and yet are so powerful in their action as to be practically irresistible. They heat and cool with great rapidity; but the movement takes place without momentum, and consequently cannot go too far, and thus produce a reaction and return movement, as in many electro-magnetic regulators. This defect of magnetic regulators, known as "hammering," has proved a source of great annoyance, because of the alternate lengthening and shortening of the arc, and consequent flickering of the light. To overcome it, dash-pots and other retarding devices have been applied, all of which are rendered unnecessary by my invention. I would remark, however, that I consider it desirable to use with this thermo-regulator the additional clutch controlled by a dash-pot, which is claimed in my application for a patent on "improvements in regulators for electric-arc lamps," executed this day, not to prevent hammering, but to guard against the slipping of the clutch F. The rapid cooling of the thermo-conductors G G' is due to the fineness of the wire which is used, it having but little substance to retain the heat and an extensive radiating-surface to diffuse it. The currents of air which are established within the casing B by the warmth of the conductors G G' serve to facilitate the conduction of heat.

In order to enable those skilled in the art to apply my invention with certainty and success, I will state the proportions which I have thus far found most advantageous. The mechanical proportions are clearly shown in Figs. 2 to 6, which are drawn to the scale given on Sheet I of the drawings. The low-resistance thermo-conductor G is wound with brass wire of .0045-inch diameter, with about ninety strands, the bars $j\ j$ being fourteen inches apart. This is for a lamp carrying a current of twenty ampères. The high-resistance thermo conductor G', the bars $j\ j$ of which are a like distance apart, is wound with the same wire, (in order to secure equal expansion and contraction of both G and G' in different outside temperatures,) a sufficient length of wire being used to give a resistance of about thirty ohms for an arc of one and one-half ohms. To give the requisite strength with such fine wire, it is necessary to use two, three, or four separate wires, dividing the current between them and increasing their length enough to effect the requisite resistance. The proportions which may be made operative are, however, capable of great variation, according to the special conditions under which the lamps are to work.

As before stated, the employment of a thermo-expansive conductor in the main circuit for the purpose of separating the carbons is not new, having long since been suggested for this purpose. The particular construction of conductor G which I have devised, however, I believe to be new—namely, the numerous fine wires receiving the current in multiple arc by being extended between opposite metallic cross-bars.

The connecting with the feeding mechanism of an electric lamp of a thermo-expansive conductor arranged in the derived circuit, as a substitute for the usual electro-magnet or solenoid, I believe to be new, and to constitute a marked improvement. The nearest construction to this of which I am aware is a a magneto-thermic regulator found in a patented lamp where the carbons are separated to establish the arc by the expansion of a conducting-wire, through which the main current flows. In that lamp the feeding of the upper carbon downward as the carbons waste away is controlled by an electro-magnet or solenoid in a derived circuit around the arc whenever the lamp is to be used on a circuit fed by continuous currents. When, however, the lamp is for use on a circuit fed by alternating currents, an expansible wire of magnetizable metal is connected to the clutch-operating lever in such manner that as the wire elongates the free end of the lever will descend, releasing the clutch. Around this wire is placed a magnetizing-coil which is connected in the derived circuit, so that as the arc lengthens and the alternating derived current increases the wire is magnetized with rapidly-alternating polarity, and thereby heated, whereby its consequent expansion causes a feed of the carbon. This construction differs from that provided by my invention in that the heating of the wire is due to magnetic action, instead of to its resistance to the passage of the derived current through it. It necessitates the employment of alternating currents and the use of an iron or steel wire, and precludes the use of very fine wire.

Figure 11:
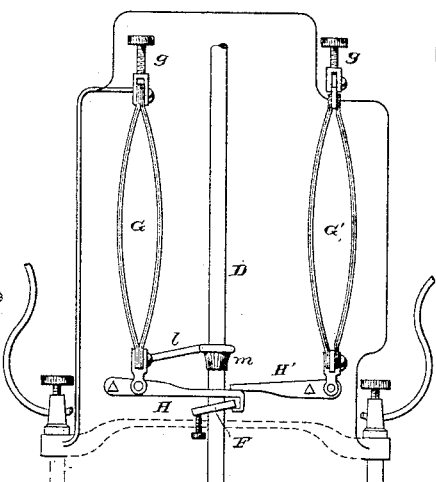
Figure 13:
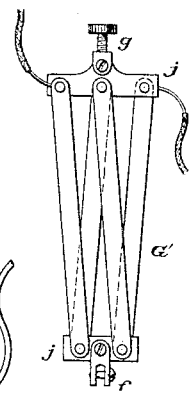
Figure 9:
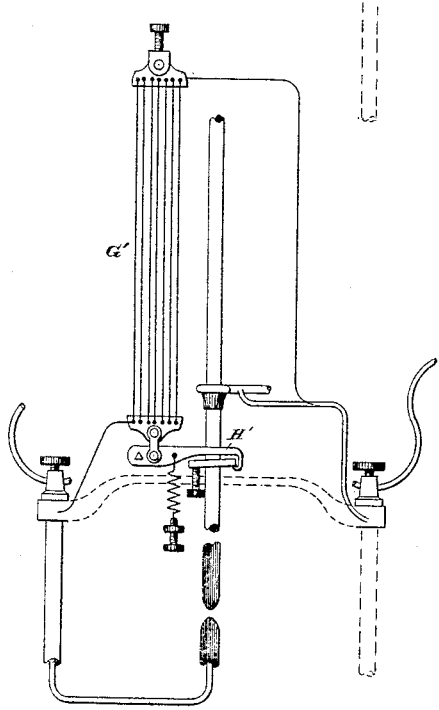
Figure 10:
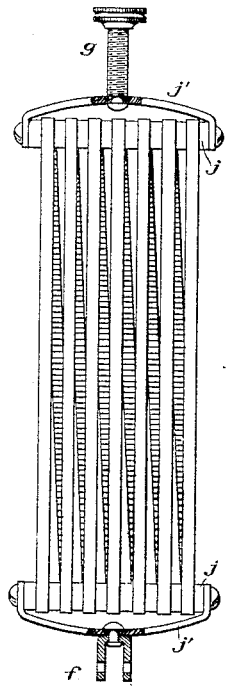
Figure 14:
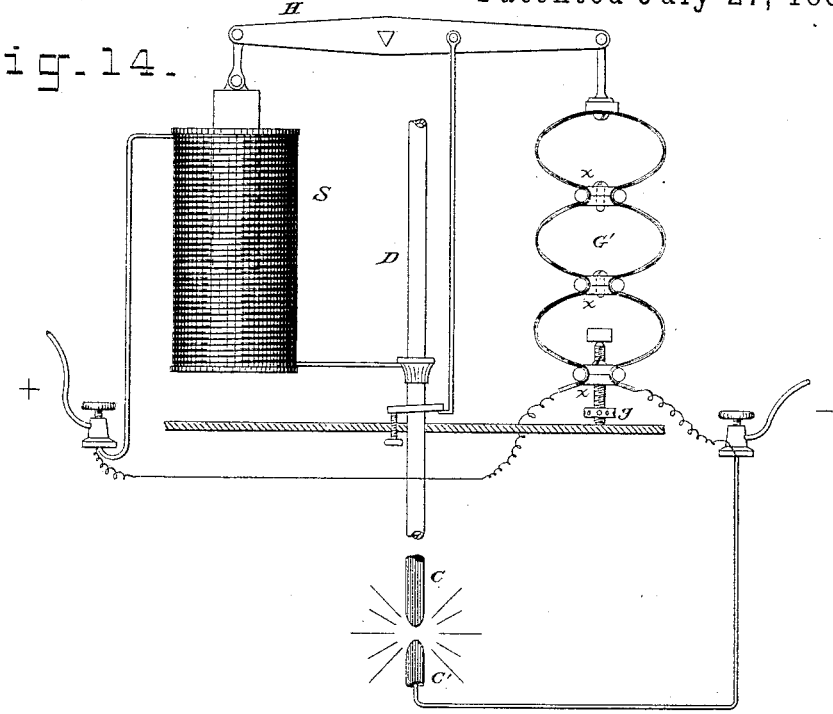
Figure 17:
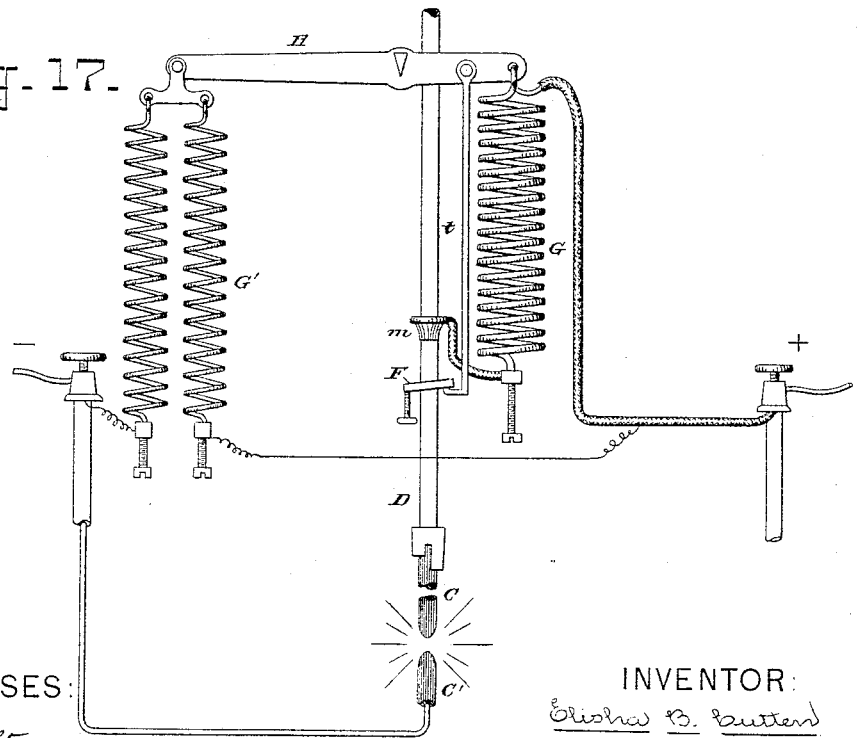
Figure 15:
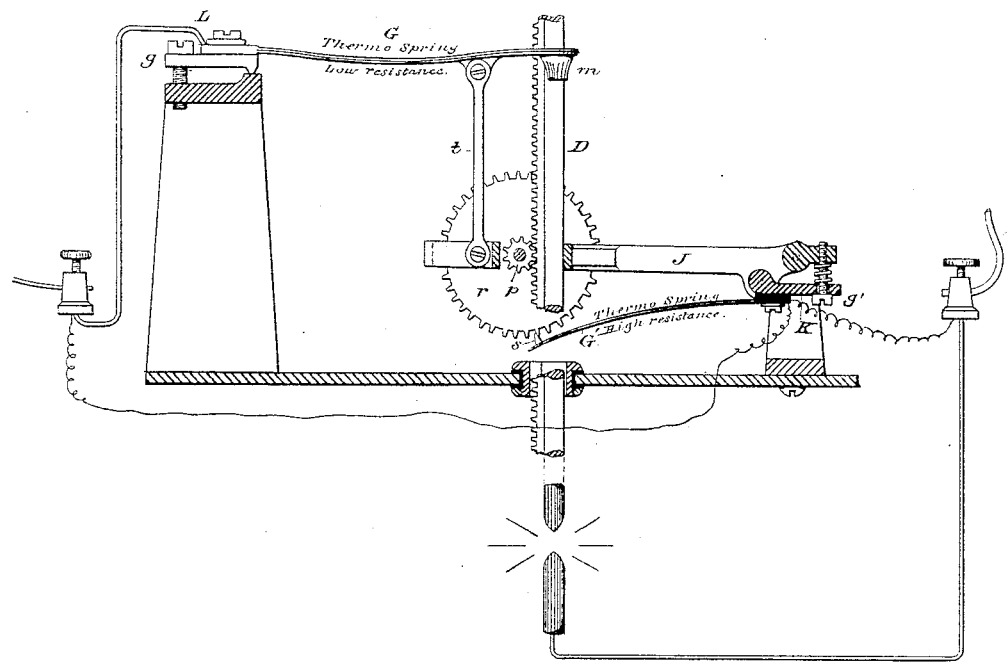
Figure 16:
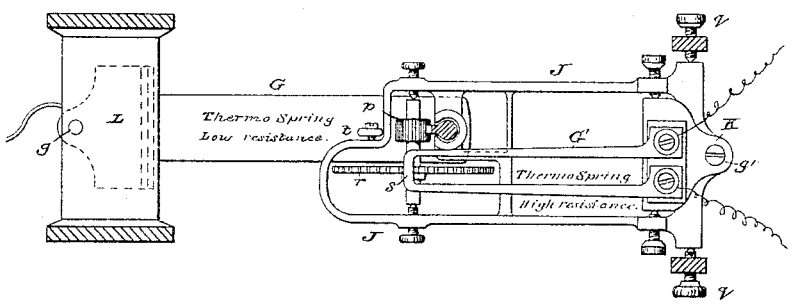

I will now proceed to describe the remaining figures of the drawings, which illustrate some modifications of which my invention is susceptible. Fig. 9 is a diagram answering to Fig. 8, and showing a lamp wherein only one thermo-conductor is used. Fig. 10 is a view of a modified thermo-conductor wherein thin metal ribbon is substituted for wire. Fig. 11 is a view corresponding to Fig. 8, showing thermo-springs in place of the expansion-conductors G G', and Figs. 12 and 13 are respectively elevations of the low-resistance and high-resistance thermo-springs. Fig. 14 shows a regulator wherein the opposite controlling elements are a low-resistance solenoid and a high-resistance thermo-spring. Fig. 15 is a vertical section showing a rack-and-pinion regulator controlled by thermo-springs, and Fig. 16 is a plan of the same. Fig. 17 is an elevation of a regulator operating by the weakening of springs when heated by the passage of the current through them.

The lamp shown in Fig. 9 is controlled solely by variations in the derived current, the thermo-conductor G' being alone used. Its construction, and that of the lever H' and spring I', is identical with that of the corresponding parts in Fig. 8. Any ordinary electro-magnetic device may be used to separate the carbons in order to establish the arc.

Fig. 10 shows a modified construction of the thermo-conductors G G', a strip of thin sheet metal being substituted for the wire. The cross-bars $j\ j$ are round rods, and the metallic ribbon is wound around them in a flat helix, after which the bars are fastened at their ends to suspending-straps $j'$, to the upper of which the screw $g$ is connected, and to the lower of which a link, $f$, is joined. For the conductor G the bars $j\ j$ are of metal and joined in the circuit. For G' these bars are of insulating material, and the circuit-wires are joined to the opposite ends of the metal strip.

Fig. 11 is introduced to illustrate how the warping of thermo-springs may be utilized according to my invention. These springs G and G' are made of leaves of two dissimilar metals, usually brass and steel, superposed and soldered or sweated together, or they may be made of a leaf of any metal—as brass—joined by riveting or otherwise to a thin plate of any flexible insulating material, such as bone or ivory. When heated by the passage of the current through them, the brass expands faster than the steel, (or insulating material, as the case may be,) thus warping the spring into a curved form, and this warping varies in extent with the variations of temperature. Both springs G and G' are made in the form of a double bow, the brass being on the outer sides, so that as the current heats the metal the springs bow outwardly, and consequently contract longitudinally.

Fig. 12 shows the low-resistance spring G. It is made, preferably, of wide sheets of thin brass and steel, the two bimetallic leaves being fastened to each other at top and bottom, the top being connected to the adjusting-screw $g$, and the bottom to the lever H, as shown in Fig. 11. The circuit-connections are at top and bottom, so that the current divides and flows through both leaves of the spring. There is no substantial novelty in this construction, the feature of my invention relating to the thermo-conductor G being here abandoned. The high-resistance thermo-spring G' is made up of four (more or less) slender bimetallic springs, riveted at their opposite ends to insulating cross-bars $j\ j$, the rivets forming an electrical connection between the springs on opposite sides. The derived circuit-wires are connected to the upper ends of the outer springs in such manner that the current flows through all the springs serially. The circuit-connections are clearly shown in Fig. 11. When the current is turned on, it heats the spring G, which, on expanding laterally, pulls upward on the lever H and lifts the clutch and carbon, thus establishing the arc. As the arc lengthens, the derived current through the thermo-spring G' increases and heats the latter, causing it to pull up on one end of the lever H', and pressing down the opposite end thereof against the lever H, thus overcoming the tension of the spring G, and releasing the clutch, and feeding down the carbon. It will be observed that the springs I I' are omitted, their functions being performed by the thermo-springs G G'.

Fig. 14 shows a combination of my thermo device with an electro-magnet. There is a solenoid, S, in the main circuit for lifting the carbon pencil, and a thermo-spring, G', in the derived circuit for feeding the carbon downward. The solenoid is of the usual construction commonly used in arc lamps, its core being connected to one end of a lever or walking-beam, H, to the opposite end of which the spring G' is connected. The rod $t$ extends from the lever down to the clutch F. The spring G' tends normally to contract sufficiently to draw the core of the solenoid partly out of its coil. Its construction is peculiar. It consists of two flat ribbons of very thin metal, brass and steel, respectively, joined together, with the brass on the outer and the steel on the inner side. The bimetallic ribbon is curved back and forth, as shown, the approaching bends being mechanically united by insulating-blocks $x\ x$. The opposite ends of this spring are connected in the derived circuit, and the tension of the spring is adjusted by a screw, $g$. As the derived current heats this spring, the brass, by expanding faster than the steel, bows the spring laterally, contracting it longitudinally, pulling down the end of the lever and releasing the clutch.

The regulator shown in Figs. 15 and 16 is of the rack-and-pinion type, controlled by thermo-springs. The pinion and train are carried by a frame, J, freely pivoted at its end between screws $q$ $q$. For the sake of clearness I have shown the pinion $p$ with only a scape-wheel, $r$, on the same spindle, omitting the usual train and fly. The scape-wheel $r$ is engaged by a tooth, $s$, on the free end of a high-resistance thermo-spring, G', the opposite end of which is fastened to a cross-bar, $k$, pivoted to the frame J, and made adjustable relatively to the latter by a screw, $g'$. The free end of the frame J is hung by a link, $t$, from the free end of the low-resistance thermo-spring G, the other end of which is fixed to a plate, L, which is mounted on knife-edge pivots and tilted by a screw, $g$, to adjust the spring G. The main current passes through the spring G, brush $m$, rod D, carbons C C', and frame A, thus heating the spring G, which in expanding raises its free end, lifting the frame J and the carbon, and thus forming the arc. The derived current flows through the high-resistance spring G', as shown in Fig. 16, this spring being U-shaped, or consisting of two springs (or more) connected electrically in series, and as it heats the spring the latter bends downwardly, thus moving the tooth $s$ out of engagement with the teeth of the wheel $r$, and permitting the latter to turn and feed the rod downward. When the arc is thus shortened sufficiently, the spring G' contracts, moves upwardly, and its tooth arrests further movement of the wheel. The same principle may with slight modification be applied to focusing-lamps of the Foucault type.

Fig. 17 shows a clutch-feed controlled by thermo-springs of a different character, each being made of only one metal, and acting by the decrease of their resilient power when heated. The heavy spring G is in the main circuit, and the light springs G' are in the derived circuit. The springs G G' pull upon opposite ends of a rocking lever, H, which is fulcrumed nearest to the spring G, to partially compensate for the initial difference in strength of the springs. The clutch F is connected to this lever by a link, $t$. When the current is turned on, it heats the spring G, thus both expanding and weakening it, so that it relaxes and permits the springs G' to contract and lift the rod D. The derived current passes successively through the two springs G', and as the arc lengthens these springs are heated and relax, thus releasing the clutch and feeding down the rod.

It may be remarked with reference to the devices shown in Figs 15 and 17, and also, probably, to that shown in Fig. 11, that in order to render them practically operative they will probably require some retarding device to prevent any sudden dropping of carbon pencil, since the thermo device G' is not likely to cool rapidly enough to check the descent of the carbon at the right instant, being liable to permit it to descend too far and make the arc too short before it will arrest its descent. It is on this account that I greatly prefer for the thermo device G' the construction shown in Fig. 6, which permits of the use of wire so extremely fine as to cool instantaneously, thus making a regulator of great sensitiveness.

What I claim as new, and desire to secure by Letters Patent, is—

1. In an electric-arc lamp, the combination, with the mechanism for feeding the carbon, of a thermo-expansive electric conductor connected to and governing said mechanism, and a derived circuit around the arc traversing said thermo-conductor, whereby the resistance afforded by said conductor to the passage of the derived current heats said conductor, and the expansion and contraction thereof control the feed of the carbon, substantially as set forth.

2. In an electric-arc lamp, the combination of mechanism for parting or separating the carbons, and an electro-motive device in the main circuit connected to and operating said mechanism, with the mechanism for feeding the carbon, a thermo-expansive electric conductor connected to and governing said mechanism, and a derived circuit around the arc traversing said thermo-conductor, substantially as set forth.

3. In an electric-arc lamp, the combination of mechanism for parting or separating the carbons, a thermo-expansive electric conductor of low resistance joined in the main circuit and connected to and operating said mechanism, with the mechanism for feeding the carbon, a thermo-expansive electric conductor of comparatively-high resistance connected to and governing said mechanism, and the derived circuit around the arc traversing said high-resistance thermo-conductor, substantially as set forth.

4. In an electric-arc lamp, the combination, with the mechanism for parting the carbons and an electro-motive device in the main circuit for actuating said mechanism, of the feeding mechanism, consisting of a clutch for engaging the carbon-holding rod and a lever for releasing said clutch, a spring connected to said lever and tending to release the clutch, a thermo-expansive conductor connected to said lever in opposition to said spring, and a derived circuit around the arc traversing said conductor, substantially as set forth, whereby the passage of the derived current through said conductor heats it, and its expansion or contraction causes a movement of said lever, whereby the feed is controlled.

5. In an electric-arc lamp, the combination of the mechanism for parting and feeding the carbons, consisting of a clutch or equivalent device for engaging the carbon-holding rod, two levers adapted to engage and act upon said clutch in opposition to each other, a low-resistance thermo-expansible electric conductor arranged in the main circuit and connected to one of said levers, a comparatively high-resistance thermo-expansive electric conductor arranged in the derived circuit around the arc and connected to the other of said levers, and two springs connected to said levers, respectively, and arranged to exert their tension in opposition to said thermo-conductors, substantially as and to the effect set forth.

6. In an electric-arc lamp, the combination of carbon-holding rod D, clutch F, lever H, adapted to lift said clutch and rod, thermo-expansive conductor G, arranged in the main circuit and connected to said lever, spring I, connected to said lever and tending to stretch said conductor and lift said clutch and rod, lever H', adapted to depress said clutch, thermo-expansive conductor G', arranged in the derived circuit around the arc and connected to lever H', and spring I', connected to said lever and tending to stretch said conductor G' and depress said clutch, substantially as and to the effect set forth.

7. A thermo-expansive conductor for governing the mechanism of an electric-arc lamp, consisting of a series of fine wires extended between parallel cross-bars and connected in the circuit in such manner that all shall be traversed by the current and heated and expanded to like extent thereby, whereby the expanding and contracting medium acts mechanically as one piece, but is so subdivided as to afford an extended radiating-surface, so that the heating and cooling of the conductor is rendered instantaneous, substantially as set forth.

8. A thermo-expansive conductor for governing the feed of an electric-arc lamp, consisting of opposite insulating cross-pieces and a fine wire wound back and forth between them, and presenting a considerable resistance to the passage of a current through it, with its terminals joined in the derived circuit around the arc, substantially as set forth, whereby an extended radiating-surface is afforded, so that the conductor is enabled to cool rapidly.

9. A thermo-expansive conductor for actuating the mechanism for parting the carbons in an electric-arc lamp, consisting of opposite conducting cross-pieces and a series of fine wires extending between them and in electrical contact with them, and the respective cross-bars connected in the main circuit, substantially as set forth, whereby the main current is divided and flows through the wires in multiple arc.

In witness whereof I have hereunto signed my name in the presence of two subscribing witnesses.

ELISHA B. CUTTEN.

Witnesses:
ARTHUR C. FRASER,
GEORGE H. FRASER.